(12) United States Patent
Schmidt et al.

(10) Patent No.: US 11,087,438 B2
(45) Date of Patent: Aug. 10, 2021

(54) MERGING OF PARTIAL IMAGES TO FORM AN IMAGE OF SURROUNDINGS OF A MODE OF TRANSPORT

(71) Applicant: Bayerische Motoren Werke Aktiengesellschaft, Munich (DE)

(72) Inventors: Torsten Schmidt, Unterschleissheim (DE); Philipp Hoffmann, Odelzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 83 days.

(21) Appl. No.: 15/402,624

(22) Filed: Jan. 10, 2017

(65) Prior Publication Data

US 2017/0116710 A1   Apr. 27, 2017

Related U.S. Application Data

(63) Continuation of application No. PCT/EP2015/064846, filed on Jun. 30, 2015.

(30) Foreign Application Priority Data

Jul. 11, 2014  (DE) .................... 10 2014 213 536.2

(51) Int. Cl.
   *G06T 7/593*  (2017.01)
   *G06T 3/40*   (2006.01)

(52) U.S. Cl.
   CPC .................. *G06T 3/4038* (2013.01)

(58) Field of Classification Search
   CPC .............. B60R 1/00; B60R 2300/607; B60R 2300/105; B60R 2300/303;
   (Continued)

(56) References Cited

U.S. PATENT DOCUMENTS 6,005,987 A * 12/1999 Nakamura ............ G06T 3/4038
                                                              382/294
6,476,855 B1   11/2002 Yamamoto
(Continued)

FOREIGN PATENT DOCUMENTS

DE   10 2006 003 538 B3   7/2007
DE   10 2009 050 368 A1   5/2010
(Continued)

OTHER PUBLICATIONS

International Search Report (PCT/ISA/210) issued in PCT Application No. PCT/EP2015/064846 dated Oct. 14, 2015 with English translation (eight pages).

(Continued)

*Primary Examiner* — Dave Czekaj
*Assistant Examiner* — Samuel D Fereja
(74) *Attorney, Agent, or Firm* — Crowell & Moring LLP

(57) ABSTRACT

A driver assistance system and a method for merging partial images to form an image of a contiguous surrounding region of a mode of transport are provided. The method includes the following steps: detecting a first partial region of the surrounding region by a first environmental sensor; detecting a second partial region of the surrounding region by a second environmental sensor; generating a first partial image of the first partial region on the basis of a signal from the first environmental sensor; generating a second partial image of the second partial region on the basis of a signal of the second environmental sensor and a multiplicity of virtual sensors for detecting the second partial region; and merging the first partial image and the second partial image along a straight first joining line, wherein the virtual sensors are arranged at positions substantially on a perpendicular to the joining line.

20 Claims, 5 Drawing Sheets

(58) Field of Classification Search
CPC ........ B60R 2300/305; B60R 2300/102; B60R 2300/301; B60R 2300/402; B60R 2300/806; B60R 11/04; B60R 2300/70; B60R 2300/8093; B60R 2300/202; B60R 2300/304; B60R 2300/306; B60R 2300/802; B60R 2300/8066; B60R 19/483; B60R 2300/108; B60R 2300/30; B60R 2300/302; B60R 2300/8086; B60R 1/06; B60R 1/0605; B60R 1/081; B60R 2011/004; B60R 2300/207; B60R 2300/404; B60R 2300/60; B60R 2300/8046; G06T 3/4038; G06T 2207/10016; G06T 2207/30252; G06T 7/73; G06T 2207/10152; G06T 11/00; G06T 2207/30261; G06T 3/0018; G06T 1/00; G06T 1/0007; G06T 2207/10012; G06T 2207/10028; G06T 5/006; G06T 7/33; G06T 7/593; G06T 15/10; G06T 15/20; G06T 17/00; G06T 2200/08; G06T 2207/20061; G06T 2207/20164; G06T 2207/30256; G06T 3/00; G06T 3/0012; G06T 7/00; G06T 7/0024; G06T 7/0028; G06T 7/0042; G06T 7/0065; G06T 7/13; G06T 7/30; G06T 7/55; G06T 7/70; G06T 7/80; G01S 7/4816; G01S 17/46; G01S 17/42; G01S 7/4812; G01S 11/12; G01S 17/026; G01S 17/66; G01S 17/936; G01S 5/163; G01S 7/499; G01S 17/023; G01S 17/32; G01S 17/89; G01S 3/783; G01S 7/4817; G01S 7/497; G01S 5/16; H04N 5/23238; H04N 7/181; H04N 5/2258; H04N 5/247; H04N 7/183; H04N 5/2254; H04N 5/2354; H04N 5/265; H04N 5/335; H04N 7/18; H04N 9/045
See application file for complete search history.

(56) References Cited

U.S. PATENT DOCUMENTS

| | | |
|---|---|---|
| 7,139,412 B2 | 11/2006 | Kato et al. |
| 2002/0167589 A1* | 11/2002 | Schofield ............... H04N 7/181 |
| | | 348/148 |
| 2009/0022423 A1 | 1/2009 | Ehlgen et al. |
| 2011/0032374 A1* | 2/2011 | Imanishi ................... B60R 1/00 |
| | | 348/222.1 |
| 2011/0074916 A1* | 3/2011 | Demirdjian .......... H04N 5/2254 |
| | | 348/36 |
| 2012/0026011 A1 | 2/2012 | Yamashita |
| 2012/0224064 A1 | 9/2012 | Euler et al. |
| 2012/0327238 A1* | 12/2012 | Satoh ........................ B60R 1/00 |
| | | 348/148 |
| 2015/0022665 A1* | 1/2015 | Lu ............................ B60R 1/00 |
| | | 348/148 |

FOREIGN PATENT DOCUMENTS

| | | |
|---|---|---|
| DE | 10 2010 023 591 A1 | 12/2011 |
| DE | 10 2011 079 913 A1 | 2/2012 |
| DE | 10 2011 087 901 A1 | 6/2013 |
| DE | 10 2012 018 326 A1 | 3/2014 |
| DE | 10 2013 203 404 A1 | 8/2014 |
| EP | 2 192 552 A1 | 6/2010 |
| GB | 2513703 A | 11/2014 |
| WO | WO 99/15360 A1 | 4/1999 |
| WO | WO 2013/126715 A2 | 8/2013 |

OTHER PUBLICATIONS

German-language Written Opinion (PCT/ISA/237) issued in PCT Application No. PCT/EP2015/064846 dated Oct. 14, 2015 (seven pages).

German Search Report issued in counterpart German Application No. 10 2014 213 536.2 dated Apr. 10, 2015 with partial English translation (12 pages).

Chinese Office Action issued in Chinese Application No. 201580034556.5 dated Sep. 16, 2020 with partial English translation (Twenty (22) pages).

Chinese Office Action issued in Chinese application No. 201580034556.5 dated Feb. 20, 2021, with English translation (Twenty Eight (28) pages).

* cited by examiner

MERGING OF PARTIAL IMAGES TO FORM AN IMAGE OF SURROUNDINGS OF A MODE OF TRANSPORT

CROSS REFERENCE TO RELATED APPLICATIONS

This application is a continuation of PCT International Application No. PCT/EP2015/064846, filed Jun. 30, 2015, which claims priority under 35 U.S.C. § 119 from German Patent Application No. 10 2014 213 536.2, filed Jul. 11, 2014, the entire disclosures of which are herein expressly incorporated by reference.

BACKGROUND AND SUMMARY OF THE INVENTION

The present invention relates to a mode of transport, a driver assistance system, and a method for merging partial images to form an image of a contiguous environment region of a mode of transport. The present invention in particular relates to the avoidance of distortions in the region of the seam line or lines.

In order to render the operation of modes of transport more comfortable and safe, driver assistance systems are used, which record environment signals using sensors and present images of the environment to the driver. In order to monitor a traffic area located behind the ego vehicle, it is known, for example, to provide a camera for recording images, which are played back to the driver on a display that is integrated in the area of the cockpit or the center console. These systems often serve as parking aids. It is additionally known to integrate these systems as a replacement for an on-board rearview mirror. Instead of monitoring the rearward traffic area via the rearview mirror, the driver can monitor it via the camera image presentation. The environment of the vehicle can be presented therewith by way of displays inside the vehicle.

DE 10 2011 079 913 discloses a viewing support system for a driver and a vehicle having such a system.

DE 10 2010 023 591 discloses the use of a stereo camera system as part of a driver assistance system for road vehicles.

U.S. Pat. No. 7,139,412 discloses a method for merging a plurality of images and an apparatus for a vehicle-based camera, the images of which are merged along a seam line.

U.S. Pat. No. 6,476,855 discloses an apparatus for displaying an image of an environment of a mode of transport.

WO 1999/015360 A1 describes a viewing device having cameras for a vehicle. Here, at least one camera is arranged on one side of the vehicle. The viewing direction permits, for example, the replacement of previous external and internal mirrors within the motor vehicle by using image recording sensors and serves, for example, as a parking aid.

Although cameras record a radial, three-dimensional (3D) field, the presentation on a monitor is distorted into a flat, rectangular plane. It is not so easy to estimate therewith the distance from objects especially in blind spots. In a fused display of the three viewing fields (mirrors), it is necessary to implement the assignment or relative position of the ego vehicle by way of a corresponding display concept.

In order to be in a position to allow rearview mirrors to be omitted not only in a manner that is suitable for the customer but also in an authorized manner, fixed image qualities are prescribed not only and in particular in the region of the seam lines of merged partial images, which are not achieved by the prior art. It is therefore an object of the present invention to meet the abovementioned demand.

The abovementioned object is achieved according to the invention by way of a method for merging partial images to form an image of a contiguous environment region of a mode of transport. To this end, in a first step, a first partial region of the environment region is captured by way of an environmental sensor. The environment region can be, for example, a rearward region of the mode of transport, which is located approximately in a region behind the front bumper of a mode of transport and to the left or right of the vehicle. The first environmental sensor can be, for example, a two-dimensional (2D) optical camera. The latter can be arranged in the region of a fender and/or an external mirror of a mode of transport. In addition, a second partial region (which is at least not entirely identical to the first partial region) of the same environment region is captured using a second environmental sensor. The second environmental sensor can likewise be an optical sensor. As opposed to the first environmental sensor, the second environmental sensor can, however, record additional information, as a result of which for example three-dimensional images of the second partial region are made possible. In a second step, a first partial image of the image of the environment region is generated on the basis of a signal of the first environmental sensor, and a second partial image of the image of the environment region is generated on the basis of a signal of the second environmental sensor. Moreover, the second partial image is based on a multiplicity of virtual sensors for capturing the second partial region. The multiplicity of virtual sensors could also be referred to as a multiplicity of alternative perspectives of the second partial region, which is established (for example calculated) on the basis of signals captured using real sensors. In this manner, a multiplicity of perspectives of the second partial region are obtained.

According to the invention, the virtual sensors are arranged at positions substantially on a perpendicular line to a seam line, along which the first partial image and the second partial image are merged. In this way, each virtual sensor has a different distance from the first seam line. In particular, each virtual sensor has an integer multiple of a base distance of a specific virtual sensor from the seam line, which is arranged relatively close to the seam line. While the seam line between two sensors, which are directed in different azimuthal spatial regions, is arranged typically vertically, it is also possible for a seam area, which defines the spatial boundary areas of different environment images during merging, to be identified for three-dimensional image regions. The virtual sensors can also be arranged on a substantially perpendicular line with respect to such a seam area. By at least one virtual sensor having a more similar perspective with respect to a covering angle limit of the first environmental sensor than the second environmental sensor, there is the possibility of generating lower distortion when merging the first partial image and the partial image using the signals of said virtual sensor. In particular when generating an image of a vehicle's environment, any distortions that arise are so low that optical aids, such as for example internal/external mirrors, can be dispensed with. In this manner, the wind resistance of a mode of transport is lowered, which lowers the energy needed to propel it. There is additionally the possibility of enriching synthetic images with additional information and of arranging the cameras at positions which presents a more extensive and thus more suitable image of the vehicle's environment. By way of example, the first partial region can include what is known as a "blind spot," which the driver of the mode of transport can otherwise capture only by accepting trade-offs in terms of comfort and with a loss of an impression of other environment regions.

A virtual sensor can preferably be arranged in the direct vicinity of the first seam line. Its perspective of the region of the seam line is thus nearly identical to that of the first environmental sensor. The distortions in this region can in this way be lowered to a level which has hitherto not been possible, whereby the relevant standards are met (for example ECE-R46).

In particular, the virtual sensors are to be arranged horizontally with respect to one another and spaced apart, such that their respective core capture regions cover vertical strips ("segments") of the second partial region which are arranged close to one another. In this way, a play-back of the second partial image which exhibits extremely low distortions is possible also for the case where subsequent conversion of the second partial image (for example from a three-dimensional database to a two-dimensional database) can follow without much distortion.

The core capture regions of the virtual sensors can be used for generating vertical image segments which are joined together along second seam lines to form the second partial image. The second seam lines can be arranged for example parallel to the first seam line. The greater the number of virtual sensors used, the lower are the distortions within the second partial image. If the seam lines or seam areas substantially correspond to the left-hand and the right-hand side of a vehicle corridor (or trajectory) along which the mode of transport drives in a straight line, the region behind the mode of transport is therefore composed of the multiplicity of segments. For example, known methods (for example alpha blending) can be used in this region. Another method is designated "interpolation of viewing rays" and is explained in detail in the publication "Megastereo: Constructing High-Resolution Stereo Panoramas." The interpolation is achieved with the aid of the net flow method. In this method, the movement ("flow") is presented at the pixel plane between two views. It is possible with this information to interpolate every intermediate position between two different views. This results in a substantial reduction in presentation problems of objects which have high deviation in the distance from the projection area.

The first environmental sensor can be, for example, a 2D sensor. It can be configured in the form of a (mono) external camera in the region of a fender, an external mirror, a door of the mode of transport, or in the region of a roof edge/a roof rack. The second environmental sensor can comprise, for example, two optical sensors or be configured in the form of a stereo camera. It can be arranged in the region of the rear of the vehicle, in particular centrally, with respect to the vehicle width. In this way, a multiplicity of image information items of the rearward region of the mode of transport is captured and kept available for subsequent processing. A person skilled in the art of image processing will understand that, according to the invention, not only is it possible for optical sensors to be used, but any sensors which generate or make possible a two-dimensional or three-dimensional image of the environment may be used. If the first partial region of a right-hand vehicle side and the second partial region are assigned to a central rearward environment region of the mode of transport, it is advantageous to provide an environmental sensor also for the left-hand vehicle side, which environmental sensor is designated the third environmental sensor in the present invention. This environmental sensor serves for the substantially mirror-symmetric extension of the environment region according to the above embodiments with respect to the first environmental sensor. In other words, a third partial region of the environment region is captured, subsequently a third partial image of the third partial region is generated on the basis of a signal of the third environmental sensor, and the third partial image and the second partial image are merged along a straight third seam line. The first seam line and the third seam line can here present in particular opposite boundary lines of the second partial image. Preferably, the first seam line and the third seam line are here oriented parallel with respect to one another. According to the invention, the distortions in the region of the third seam line are also reduced.

In order to avoid artifacts, as can occur for example in what is known as "alpha blending," the partial images can be cropped before they are merged along the respective seam line. A significant overlap, as is necessary for known algorithms when merging different images, can be omitted according to the invention. This is also why the susceptibility of the joining method according to the invention with respect to image contents, which known algorithms regularly bring to their borders, is lower. In other words, the first partial image can be purged along the first seam line, the third partial image along the third seam line, and the second partial image along the first and the third seam lines of image portions which are located in each case beyond the seam line. If the perspectives of the sensors used are nearly identical in the joining region, distortions are significantly lower independently of image contents or imaged objects than according to the prior art.

A first 2D data set can preferably be generated from the first partial image, which 2D data set offers a suitable perspective of a user when providing the 2D data set on a two-dimensional display unit. The content of the first partial image is here "converted" to a virtual first projection area in order to bring the different perspectives of the environmental sensors together. Accordingly, the segments of the second partial image and the third partial image are also converted into respective 2D data sets by placing them on respective suitable virtual projection areas. If the second partial image hitherto contained three-dimensional data, first a perspective or a suitable distance (relative position with respect to the mode of transport) of the projection area can be dynamically determined. To this end, it has proven advantageous to take into consideration the current position of an environment object contained in the region of the seam lines for the positioning of the projection area. In particular, the distance of the projection area from the mode of transport can be substantially identical to the distance of the environment object from the mode of transport. The distortions can be furthermore reduced by this connection.

Likewise favorable for further reduction of the distortions is a second virtual projection area which corresponds to the first virtual projection area. In other words, the projection areas have in the region of the seam lines identical distances from the mode of transport.

The first virtual projection area can have a concave shape in the manner of a cylindrical segment, with the user being on the inside of the cylinder. The same applies to the second virtual projection area and to a third virtual projection area which is possibly used for a 2D data set which was compiled using a third environmental sensor. In particular, the respective cylindrical-segment-type projection areas are arranged on a common cylindrical area, while the user or the mode of transport is located substantially at the center of the cylinder.

In order to be able to replace internal/external mirrors using the above-described method, it is necessary to display at least a portion of the generated image of the environment region on a display unit within the mode of transport. In particular, the display unit can be a 2D display unit which is arranged in a dashboard and/or an instrument cluster of the mode of transport. In order to bring the region which is monitored by the image and the image resolution to a suitable ratio with respect to one another, a solid angle range that is to be presented on the 2D display unit between values of 180° and 45°, in particular between 120° and 60°, and preferably between 100° and 80° has proven suitable. In the range between 78° and 90°, the blind spot of the mode of transport is eliminated for the driver, as a result of which the acceptance of the image according to the invention of the environment region increases and the added safety for road traffic significantly increases.

Preferably, a position of the displayed portion of the image can be changed in response to respective driving situations. While it is known for external mirrors to present a region near a curb in response to a reverse gear being engaged, which is also possible according to the invention by way of modifying the angle range of the displayed portion of the image, a particularly preferred embodiment makes provision for the activation of an indicator to be taken as the cue for a modified presentation of the image. By way of example, the side region which is in each case relevant when turning a corner can be extended in that additional portions of the respective environmental sensor signal are given a place in the image according to the invention.

According to a second aspect of the present invention, a driver assistance system is proposed which comprises a first environmental sensor, a second environmental sensor, an evaluation unit and a 2D display unit. The evaluation unit can comprise, for example, a programmable processor in the form of a microcontroller or a nanocontroller. In the automotive field, such evaluation units are also referred to as electronic control units (ECU). The 2D display unit can be provided, for example, as a matrix display for being mounted in a dashboard of a mode of transport and/or in an instrument cluster of a mode of transport. What was said in connection with the first-mentioned invention aspect correspondingly applies to the first environmental sensor, the second environmental sensor and an optionally utilizable third environmental sensor. In this way, the driver assistance system is adapted to realize the features, combinations of features and the advantages that result therefrom corresponding to the first-mentioned invention aspect.

According to a third aspect of the present invention, a mode of transport is proposed, which can for example be in the form of a passenger car, a transporter, a truck, a watercraft and/or an aircraft. According to the invention, the mode of transport has a driver assistance system, as has been described above. Since the mode of transport in this way realizes the same features, combinations of features and advantages, the ease of use for the user and the traffic safety for all traffic participants located in the region of the mode of transport increases.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
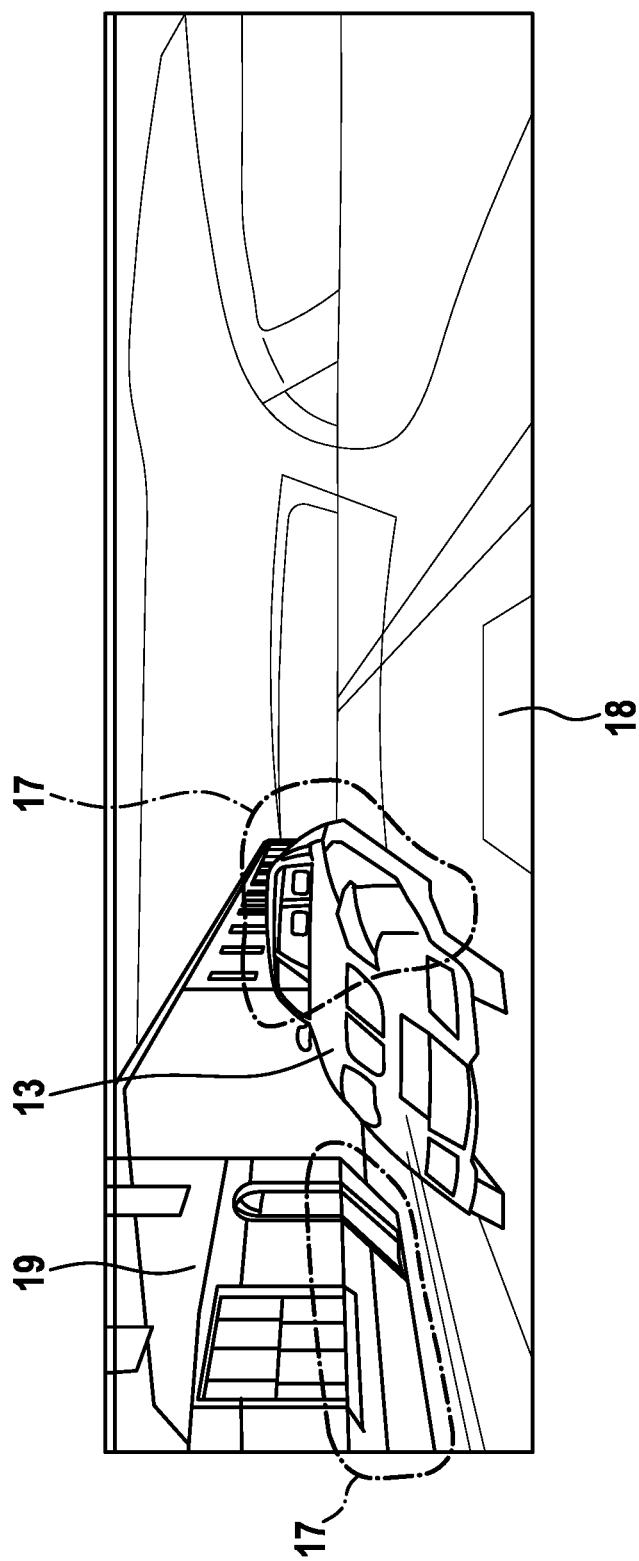
FIG. 1 is an image of a driving situation which includes artifacts.

FIG. 1 shows an image, which is merged according to the prior art, of a driving situation as may be observable through the rearview mirror of an ego vehicle. As an environment object, an alter vehicle 13 is driving on the road behind the ego vehicle. In addition, buildings 19 line the edge of the road. Owing to the different positions of the cameras used, no image data are available in an image region 18. On account of the joining methods used, artifacts 17 occur, which result in distortions within the image.

Figure 2:
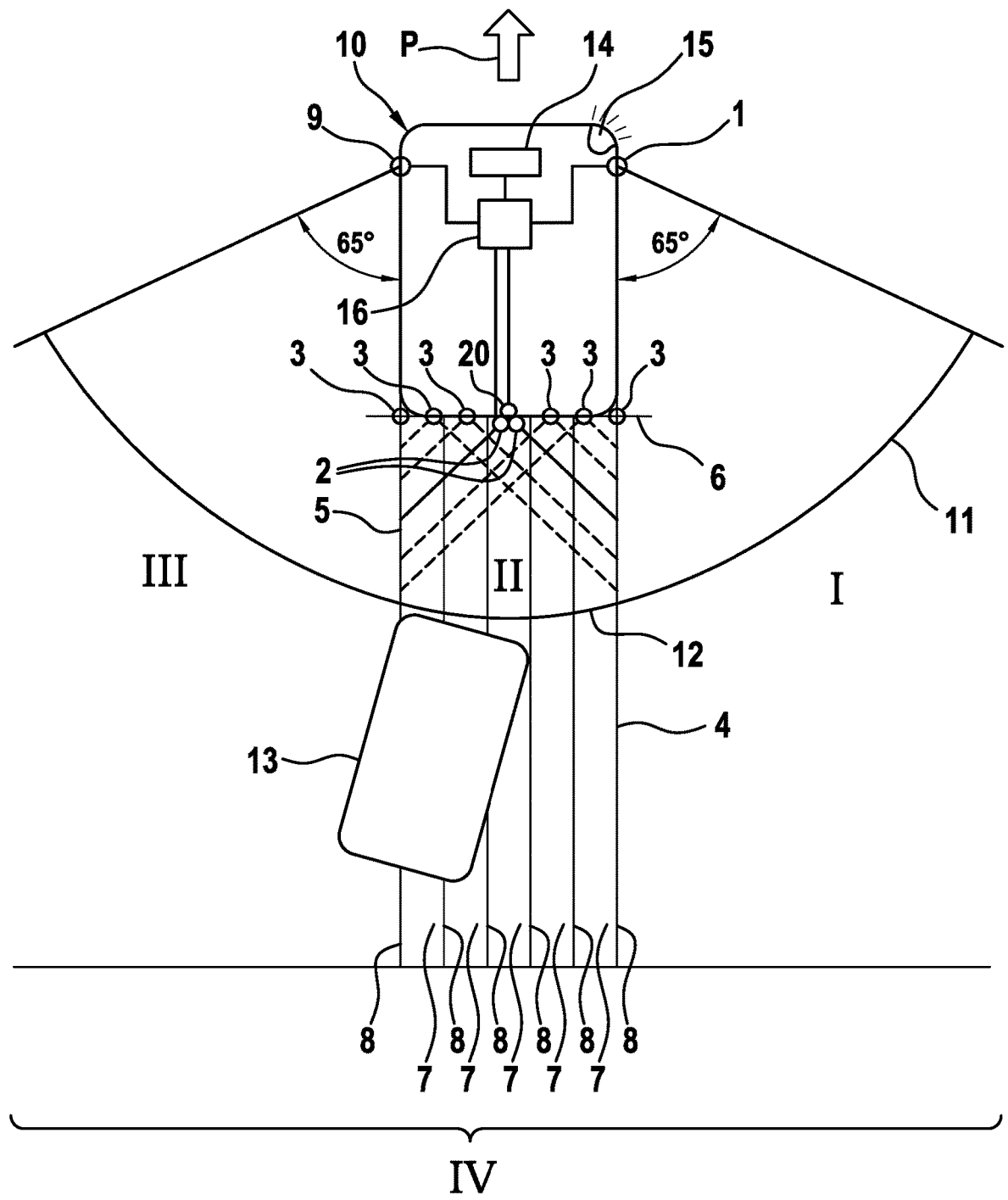
FIG. 2 illustrates schematically components of an exemplary embodiment of a mode of transport according to the invention.

FIG. 2 shows a schematic plan view of a driving situation of an exemplary embodiment of a passenger vehicle 10 which is configured according to the invention in the form of an ego mode of transport. The passenger vehicle 10 moves in the driving direction P. In the region of its right-hand fender, an external camera 1 is arranged as a first environmental sensor, which captures an azimuthal angular range of 65°. Correspondingly, an external camera 9 is arranged on the left-hand side of the passenger vehicle 10 in the region of the fender as a third environmental sensor. Centrally in the rear of the vehicle, a stereo camera 2 is arranged, which is supplemented by an additional 2D external camera 20. All cameras 1, 2, 9, 20 are connected in an information-technological manner to an electronic control unit 16 as an evaluation unit. Moreover, a screen 14 as a 2D display unit is connected to the electronic control unit 16. In order to merge the information captured using the cameras 1, 2, 9, 20 with little distortion to form an image of the environment IV, a multiplicity of data packets is calculated from the images of the stereo camera 2 and the 2D external camera 20, whose perspectives correspond to virtual sensors 3 which are arranged substantially on a line along the rear-side bumper of the passenger vehicle 10. For the sake of better identifiability, a perpendicular line 6 is drawn, which is perpendicular to the seam lines 4, 5 or seam areas (in the direction perpendicular to the image plane). Respective conical capturing regions of the virtual sensors 3 are indicated by dashed lines. The core regions 7 of the capturing regions form segments which can be assembled along second seam lines 8 to form an image II' of the partial region II (see FIG. 3). Since the respective perspective of the outermost virtual sensors 3 on the first seam line 4 or the third seam line 5 is identical to the perspective of the external cameras 1 or 9, only reduced irregularities occur when joining the images I', II' and III' of the partial regions I, II, III. In order to further increase this effect, virtual projection areas 11, 12 are drawn, which are arranged on a common cylindrical surface. The distance of the cylindrical projection area 12 is here selected such that it substantially corresponds to the distance of an alter vehicle 13 as an environment object. An image IV' (see FIG. 4), illustrated on the screen 14, of the environment region IV is selected in dependence of an operating state of an indicator 15 in order to preferably present environment regions which are particularly relevant to the driver of the passenger vehicle 10.

Since in the region between the external cameras 1, 9 and the virtual sensors 3 no image data is present (the ego vehicle is located in this region), it is not possible to sensibly generate an image signal here either (see reference sign 18 in FIG. 1).

Figure 3:
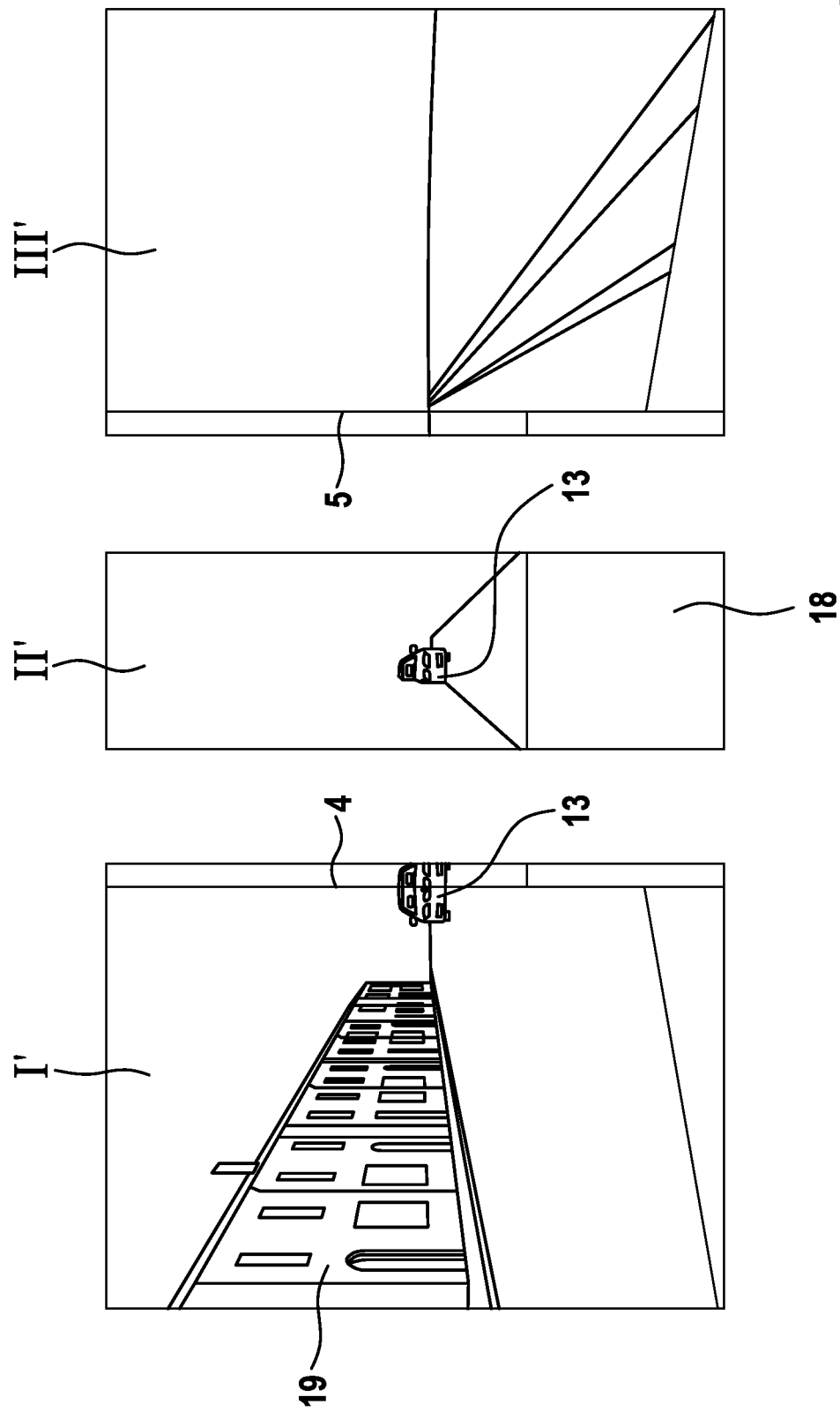
FIG. 3 illustrates partial images of an environment region which are produced according to an embodiment of the invention.

FIG. 3 shows three partial images I', II', III', in which an alter vehicle 13 as an environment object is arranged in the region of a first seam line 4. The portions of the alter vehicle 13 which are in each case located in the first partial image I' or in the second partial image II' are configured such that they substantially correspond to one another. Merging is therefore possible without difficulty, and a minimum of irregularities should be expected. What can be seen is that the region 18 which has hitherto been devoid of data within the partial images I', II', III' offers a chance to either add portions of the ego mode of transport and/or an additional notification to its user.

Figure 4:
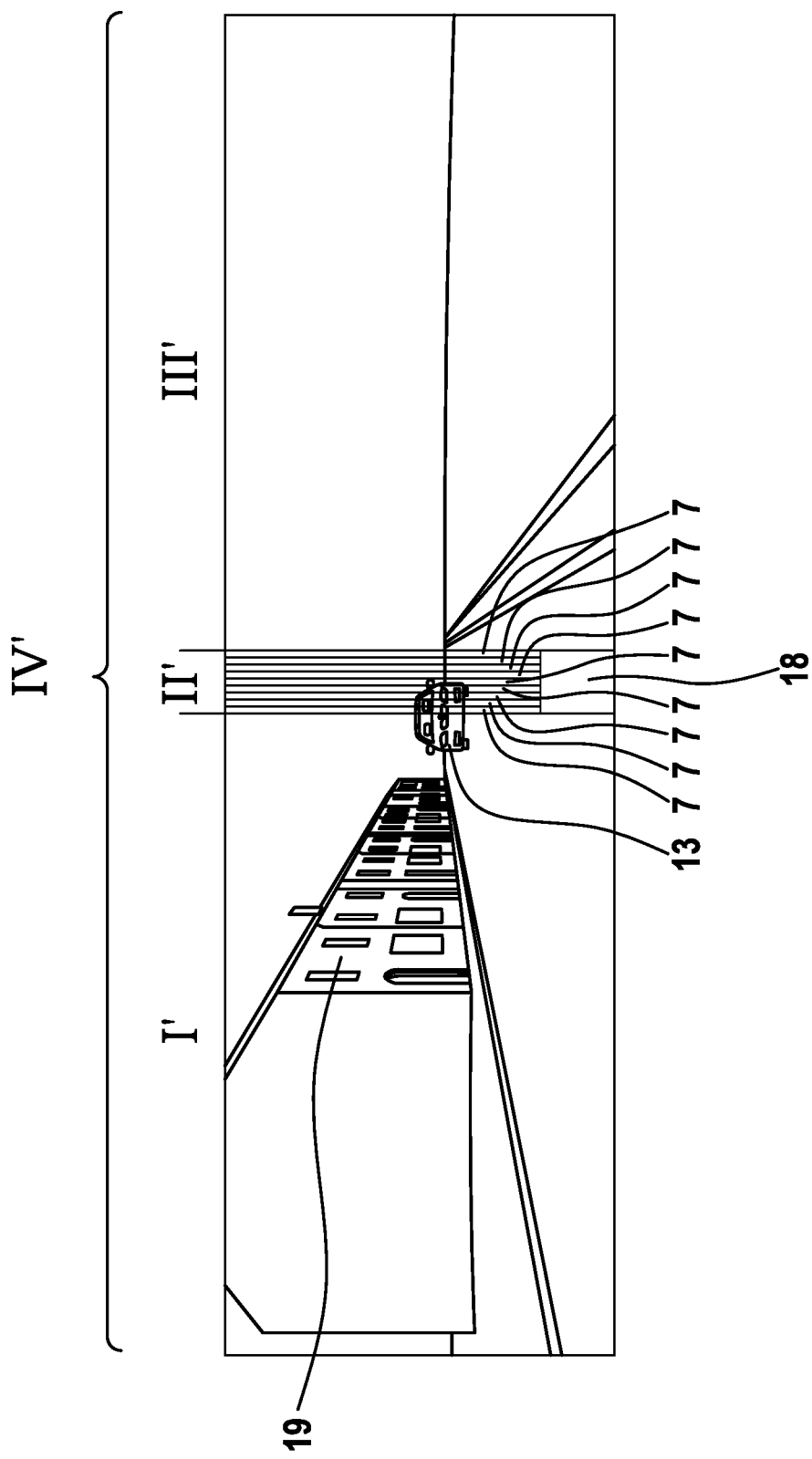
FIG. 4 illustrates a synthesis according to an embodiment of the invention of the partial images illustrated in FIG. 3.

FIG. 4 shows the results of a joining process carried out according to the invention using the partial images I', II', III' shown in FIG. 3. The merged image IV' of the environment region has a multiplicity of image segments 7, recorded by virtual sensors 3, which could appear at most as slight variations with respect to the image brightness (not illustrated in the drawing). Both the contours and the perspectives of the different regions of the alter vehicle 13 match one another significantly better than in the illustration according to FIG. 1. In this way, a replacement for external/internal mirrors has been provided which is acceptable for customers and conforms to standards.

Figure 5:
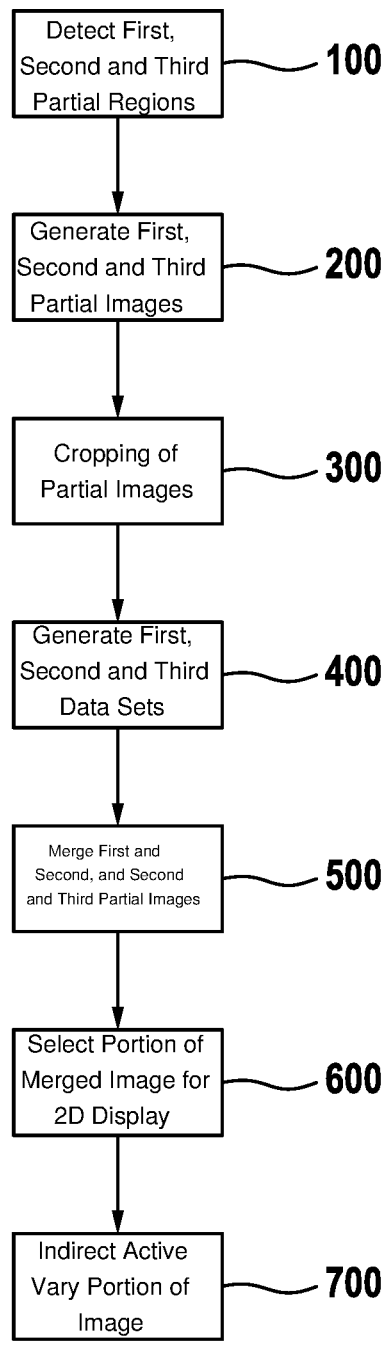
FIG. 5 is a flowchart which illustrates steps of an exemplary embodiment of a method according to the invention.

FIG. 5 shows method steps of an exemplary embodiment of a method according to the invention. Here, in step 100, a first partial region, a second partial region and a third partial region of the environment region of a mode of transport of respective environmental sensors are captured. The environmental sensors can comprise, for example, optical cameras. In particular the second environmental sensor for capturing the second partial region can comprise a stereo camera or be adapted in another way for producing a 3D image of the second partial region. In step 200, a first partial image, a second partial image and a third partial image are generated on the basis of the signals of the environmental sensors. In step 300, the partial images are subsequently cropped in order to avoid in a manner according to the invention non-necessary overlaps in the regions of a first and a third seam line. In step 400, a first, a second and a third 2D data set are generated from the partial images on the basis of the partial images which have been cropped. To this end, a first, a second and a third projection area are used, which are located on a common cylindrical surface (specifically on the inside of that cylinder). The radius of the cylinder is here established on the basis of an environment object contained in the second partial region. In step 500, the first and the second partial images and the second and third partial images are merged along a respective straight seam line, wherein the seam lines are arranged parallel to one another. In the merged image of the environment region, the seam lines have a vertical orientation. In step 600, a portion of the image is selected for display on a 2D display unit, which corresponds to an azimuthal angular range of 81°. In this way, the user of the method perceives no more blind spot next to his mode of transport. In step 700, an indicator is activated on account of an intended drive around a bend, and in response thereto a position of the portion within the image of the environment region is varied in order to better image the inside of the curve of the intended drive around the bend on the 2D display unit. To this end, the displayed angular range is either extended or pivoted such that for a short period of time, regions which have hitherto been presented are no longer displayed at an opposite edge region.

According to the invention, all the lateral and/or rearview viewing fields necessary for the driver are covered by a panorama image that is generated using environmental sensors. As a result, the legal minimum viewing fields and maximum permissible distortions are complied with, as are defined among others in the standard ECE-R46. The panorama image is produced by the favorable positioning of the camera model, and preferably replaces all mirrors of the mode of transport which is configured according to the invention.

In one exemplary embodiment of the present invention, the first and the third partial images from the perspective of the front side of a vehicle are cropped in a manner such that the vehicle contours are no longer contained in the constituent part of the respective image. The rear camera is configured in the form of a stereo camera, which generates a depth map (disparity map). The information of the disparity map can of course also be obtained using additional (for example non-optical) sensors. The original image of the 2D image information is placed onto the 3D information. Then, in the capturing region of the stereo camera, a plurality of virtual cameras are produced which are intended to capture very narrowly only the respective region behind the vehicle in the width of the vehicle. By way of cropping the 3D image information, a "driving corridor" (with assumed straight driving direction) comes about in the vehicle width behind the ego vehicle. As a last step, the lateral cameras are projected onto a cylindrical area and are merged seamlessly with the central driving corridor.

Owing to the panorama image that is generated according to the invention, the viewing field of the driver can be extended. According to the invention, the view is not blocked by vehicle parts. Owing to the cropping according to the invention of the partial images, no redundant image contents between the individual viewing fields occur either. The panorama image makes possible a significantly better presentation of environmental information for assisting drivers. The panorama presentation makes it possible either to use an individual smaller monitor with the same absolute viewing field, which entails cost advantages, weight advantages and volume advantages, or the presentation of a larger viewing field on a single monitor of a given size. By using a large azimuthal viewing angle of at least 78°, it is additionally possible to reduce or eliminate the blind spot region.

List of Reference Signs

1 external camera
2 stereo camera
3 virtual sensors
4 first seam line
5 third seam line
6 perpendicular line to the seam lines 4, 5
7 segments
8 second seam lines
9 external camera
10 passenger vehicle
11, 12 projection area
13 alter vehicle
14 screen
15 indicator
16 electronic control unit (evaluation unit)
17 artifacts
18 image region devoid of data
19 buildings 20 2D external camera
100-700 method steps
I first partial region
I' first partial image
II second partial region
II' second partial image
III third partial region
III' third partial image
IV environment region
IV' image of the environment region
P arrow (driving direction)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for merging partial images to form an image of a contiguous environment region of a mode of transport, the method comprising the steps of:
   capturing a first partial region of the environment region using a first environmental sensor;
   capturing a second partial region of the environment region using a second environmental sensor;
   generating a first partial image of the first partial region on the basis of a signal of the first environmental sensor, wherein the first partial image occupies an image plane;
   generating a second partial image of the second partial region from a signal of the second environmental sensor,
     wherein the second partial image occupies the image plane,
     wherein the second partial image is generated as a composite of a plurality of virtual image segments occupying the image plane, each virtual image segment derived from the signal of the second environmental sensor and corresponding to a respective virtual perspective of a virtual sensor of a multiplicity of virtual sensors arranged at linearly displaced positions substantially along a line that is perpendicular to the first seam line and parallel to the image plane,
     wherein a first outermost virtual sensor of the multiplicity of virtual sensors and the first environmental sensor are arranged substantially along the first seam line; and
   merging the first partial image and the second partial image along a straight first seam line.

2. The method as claimed in claim 1, wherein a virtual sensor is arranged in a direct vicinity of the first seam line.

3. The method as claimed in claim 1, wherein the virtual sensors are arranged horizontally with respect to one another and spaced apart.

4. The method as claimed in claim 1, wherein the second partial image comprises segments which are assigned to a virtual sensor, which segments are merged together along second seam lines which extend substantially parallel to the first seam line.

5. The method as claimed in claim 1, wherein the first environmental sensor is a 2D sensor, and/or the second environmental sensor is a 3D sensor arrangement.

6. The method as claimed in claim 1, wherein the environmental sensors comprise optical sensors.

7. The method as claimed in claim 1, further comprising the steps of:
   capturing a third partial region of the environment region using a third environmental sensor;
   generating a third partial image of the third partial region on the basis of a signal of the third environmental sensor; and
   merging the third partial image and the second partial image along a straight third seam line, wherein the first seam line and the third seam line represent mutually opposite boundary lines of the second partial image.

8. The method as claimed in claim 7, further comprising the steps of:
   removing a region of the first partial image, which is potentially located beyond the first seam line, before merging;
   removing regions of the second partial image, which are potentially located beyond the first seam line and/or the third seam line, before merging; and/or
   removing a region of the third partial image, which is potentially located beyond the third seam line, before merging.

9. The method as claimed in claim 7, wherein a perspective of a second outermost virtual sensor of the multiplicity of virtual sensors is substantially the same as a perspective of the third environmental sensor.

10. The method as claimed in claim 1, further comprising the steps of:
    generating a first 2D data set from the first partial image with respect to a virtual first projection area, and/or
    generating a second 2D data set from the second partial image with respect to a virtual second projection area, wherein a position of an environment object relative to the mode of transport dynamically determines a position of the projection area.

11. The method as claimed in claim 10, wherein the first virtual projection area at the first seam line corresponds to the second virtual projection area.

12. The method as claimed in claim 11, wherein
    the first virtual projection area has a concave shape in the manner of a cylindrical segment, and/or
    the second virtual projection area has a concave shape in the manner of a cylindrical segment, wherein the respective shapes in the manner of a cylindrical segment belong to a common cylinder.

13. The method as claimed in claim 10, wherein
    the first virtual projection area has a concave shape in the manner of a cylindrical segment, and/or
    the second virtual projection area has a concave shape in the manner of a cylindrical segment, wherein the respective shapes in the manner of a cylindrical segment belong to a common cylinder.

14. The method as claimed in claim 1, further comprising the step of: displaying a portion of an image on a 2D display unit within the mode of transport, where the image comprises a result of said merging the first partial image and the second partial image, and wherein the portion of the image represents captured imagery spanning an angular range of between 180° and 45°.

15. The method as claimed in claim 14, further comprising the step of:
    varying a position of the portion of the image in response to a driving situation which is identified by way of activating an indicator and/or by a preparation for driving in reverse.

16. The method as claimed in claim 1, further comprising the step of: displaying a portion of an image on a 2D display unit within the mode of transport, where the image comprises a result of said merging the first partial image and the second partial image, and wherein the portion of the image represents captured imagery spanning an angular range of between 120° and 60°.

17. The method as claimed in claim 1, further comprising the step of: displaying a portion of an image on a 2D display unit within the mode of transport, where the image comprises a result of said merging the first partial image and the second partial image, and wherein the portion of the image represents captured imagery spanning an angular range of between 100° and 80°.

18. A driver assistance system, comprising:
   a first environmental sensor;
   a second environmental sensor;
   an evaluation unit; and
   a 2D display unit, wherein the driver assistance system is adapted to carry out a method as claimed in claim 1.

19. A mode of transport, comprising:
   a driver assistance system, comprising:
   a first environmental sensor;
   a second environmental sensor;
   an evaluation unit; and
   a 2D display unit, wherein the driver assistance system is adapted to carry out a method as claimed in claim 1.

20. The mode of transport as claimed in claim 19, wherein the mode of transport is a passenger vehicle, a transporter, a truck, a watercraft and/or aircraft.

\* \* \* \* \*